US006979035B2

(12) United States Patent
Freeland

(10) Patent No.: US 6,979,035 B2
(45) Date of Patent: *Dec. 27, 2005

(54) MATTRESS CADDY

(76) Inventor: Kenneth Wayne Freeland, 305 Wisewell Ct., Baltimore, MD (US) 21227

( * ) Notice: Subject to any disclaimer, the term of this patent is extended or adjusted under 35 U.S.C. 154(b) by 175 days.

This patent is subject to a terminal disclaimer.

(21) Appl. No.: 10/787,490

(22) Filed: Feb. 26, 2004

(65) Prior Publication Data
US 2004/0164574 A1 Aug. 26, 2004

Related U.S. Application Data

(63) Continuation-in-part of application No. 10/321,864, filed on Dec. 17, 2002, now Pat. No. 6,736,437.

(60) Provisional application No. 60/341,363, filed on Dec. 17, 2001.

(51) Int. Cl.$^7$ .............................................. B65G 7/12
(52) U.S. Cl. .................................... 294/152; 294/167
(58) Field of Search ............................... 294/152, 153, 294/157, 167, 168, 74; 224/157

(56) References Cited

U.S. PATENT DOCUMENTS

| 466,670 | A | * | 1/1892 | Fler | 294/152 |
| 2,399,786 | A | * | 5/1946 | Caton | 294/153 |
| 2,514,098 | A | * | 7/1950 | Shreiner | 294/1.1 |
| 2,676,835 | A | * | 4/1954 | Mckinney | 294/74 |
| 2,973,218 | A | * | 2/1961 | Schaum | 294/142 |
| 3,301,453 | A | * | 1/1967 | Stewart | 294/152 |
| 4,521,045 | A | * | 6/1985 | Hart | 294/149 |
| D323,730 | S | * | 2/1992 | Burney | D34/28 |
| 5,102,178 | A | * | 4/1992 | Staats, Jr. | 294/152 |
| 5,863,056 | A | * | 1/1999 | Hostetter | 280/47.371 |
| 5,887,923 | A | * | 3/1999 | Gardner, III | 294/81.55 |
| 6,102,462 | A | * | 8/2000 | Fields | 294/152 |
| 6,736,437 | B2 | * | 5/2004 | Freeland | 294/152 |

* cited by examiner

Primary Examiner—Dean J. Kramer
(74) Attorney, Agent, or Firm—Law Offices of Royal W. Craig

(57) ABSTRACT

An apparatus designed to assist the manual transportation of large, heavy or unwieldy articles. The preferred embodiment is an economically-designed mattress caddy fabricated of a variety of strong light-weight materials (e.g. nylon, aluminum) to provide functionality and durability. The main components of the present invention include a support strap, with handles formed at each end, and two cradle assemblies. To transport a mattress, the apparatus is first laid out lengthwise, with the cradle assemblies positioned open-end-up, to facilitate the loading of the mattress. The cradle assemblies are then positioned along the strap at intervals. A long edge of the mattress is then placed into each of the cradle assemblies. Each individual then grasps a handle with one hand, places his/her other hand on opposite surfaces of the vertically-oriented mattress to balance the load, and lifts the mattress off of the ground/floor.

6 Claims, 3 Drawing Sheets

MATTRESS CADDY

CROSS-REFERENCE TO RELATED APPLICATION(S)

The present application is a continuation-in-part of U.S. application Ser. No. 10/321,864, filed 17 Dec. 2002, now U.S. Pat. No. 6,736,437, which in turn derives priority from U.S. Provisional Patent Application No. 60/341,363 filed Dec. 17, 2001.

BACKGROUND OF THE INVENTION

1. Field of the Invention

The present invention relates to tools to assist in two-person manual transportation of large, heavy or unwieldy articles and, more particularly, to an improved mattress caddy for moving mattresses.

2. Description of the Background

The transportation of large, heavy or unwieldy articles remains a problem, even in the professional moving industry. The need to move or lift such articles, using only human power, has led to the development of helpful devices such as dollies, pulley/lever assemblies, hand trucks and the like. However, despite the existence of many such manual devices, there remain situations where all known devices are useless (e.g. movement of unwieldy and/or limp articles within typical buildings).

Prior devices designed to assist with the manual transportation of large, heavy or unwieldy articles include U.S. Pat. No. 4,463,977 to Wyatt. The patent discloses a hand-grippable carrier for individual use in carrying large planar articles. The apparatus contains a central grip and two curved support members attached thereto. A combined spacer and grip is provided proximate to the main grip for initially positioning the carrier for transport. Unfortunately, the apparatus is designed for use by a single individual and is, therefore, limited to objects whose size and/or weight can be managed by one person.

A second apparatus is found in U.S. Pat. No. 5,251,945 to Stoops. The patent discloses an apparatus for the protection and assistance in the manual transportation of bulky articles. The article to be carried is placed at the longitudinal center of the main panel and the longitudinal ends thereof brought upwardly about it. Straps with appropriate fasteners are provided on the main panel to maintain the longitudinal ends in the upward configuration about the article. A pair of handles located on each longitudinal end of the main panel, are provided for the user to grasp. To protect the article against moisture and electrical shock, the apparatus is preferably formed of a waterproof and electrically insulating material. Additionally, the apparatus may include a top flap along one longitudinal end and side flaps at each lateral edge extending from the longitudinal end containing the top flap to a point beyond the longitudinal center of the main panel. These flaps serve to surround the enclosed article for further protection. Unfortunately, the apparatus is, once again, designed for use by a single individual and is, therefore, limited to objects whose size and/or weight can be managed by one person. The apparatus is also costly to manufacture relative to its utility as a means for simply carrying, and to some degree protecting, bulky articles.

The problem is acute in the case of the typical mattress and box spring. The typical mattress is very heavy, very limp, and commonly equipped only with a limited handle or support strap carrying system. The locations of the handles/support straps are such that they become useless in many scenarios (e.g. ascending/descending a flight of stairs, regardless of whether or not the flight includes one or more turns). Mattresses can weigh hundreds of pounds, and the lack of appropriate means to hold on to a mattress makes manipulation within a typical home an exasperating, and often exhausting, process even for physically imposing individuals. It is a two-person job, and there is no way for two people to get four arms around a mattress. The aforementioned prior art devices offer minimal assistance.

Therefore, there remains a need for an apparatus that provides two individuals with an improved means for manually transporting large, heavy or unwieldy articles such as mattresses. An apparatus of this type should minimize back strain, maximize maneuverability, and also be simple and economical to manufacture in order to provide for widespread use.

SUMMARY OF THE INVENTION

It is, therefore, the primary object of the present invention to provide an improved apparatus for the two-person manual transportation of large, heavy or unwieldy articles.

It is another object to provide an improved apparatus for the manual transportation of large, heavy or unwieldy articles by two individuals that equalizes the stature of the two individuals, firmly secures the article being carried (to improve safety), and vastly increases the maneuverability of the article (i.e. two individuals using the present invention may transport an article of a certain size and/or weight that would require two, more physically imposing individuals to transport without the utilization of the improved apparatus).

It is a more specific object to provide a mattress caddy for two-person manual transportation of large, heavy and unwieldy mattresses and box springs that is easy to use, easy on the back, and which increases maneuverability for both participants.

It is still another object of the present invention to provide an improved apparatus as described above that is relatively simple and economical to manufacture.

In accordance with the above objects, the present invention is an apparatus used by two individuals to transport a large, heavy or unwieldy article. The preferred embodiment comprises a support strap formed into substantially circular handles at each end and two cradle assemblies attached to the strap at points between the handles. The support strap and cradle assemblies are fabricated of a variety of strong light-weight materials (e.g. nylon, aluminum) to provide the functionality and durability required by the nature of their usage. The present invention's design is simple and straightforward, and can be economically manufactured.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
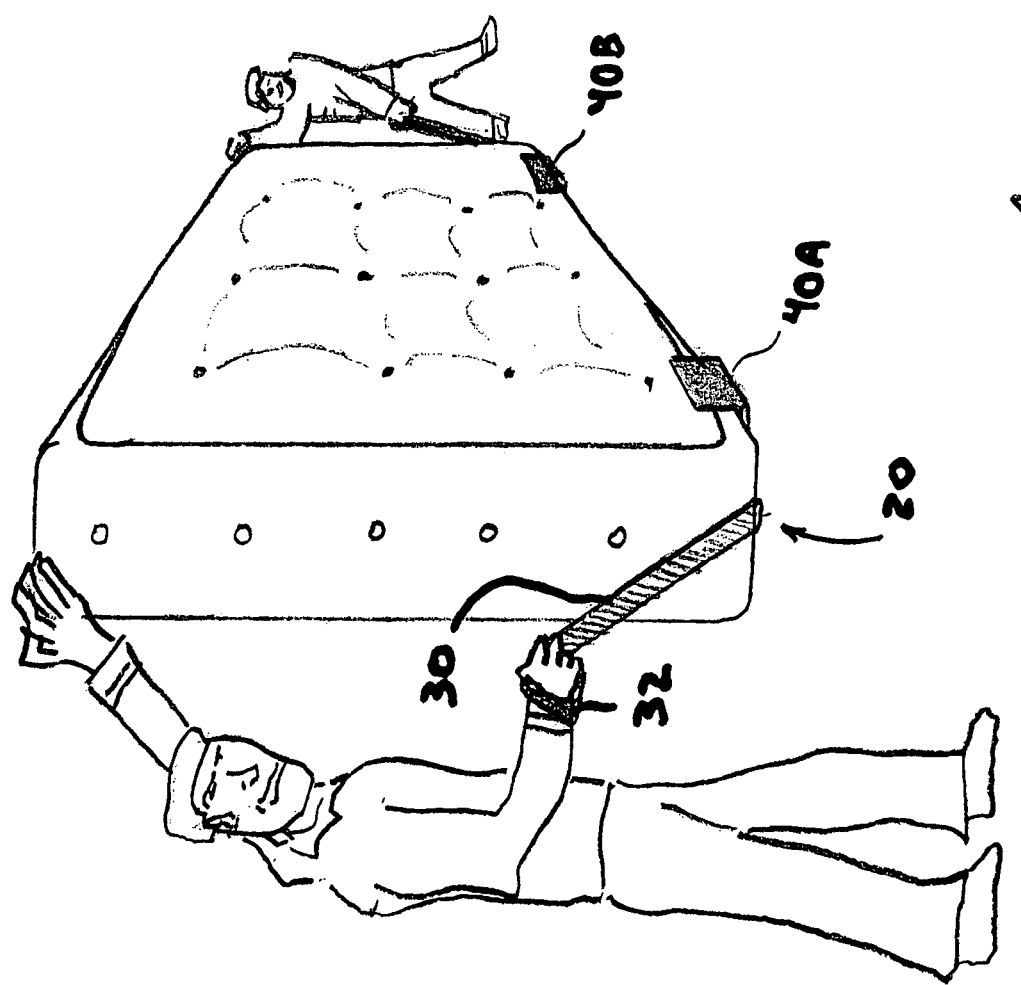
FIG. 1 is a perspective view of a mattress caddy 20 being used for transporting a mattress according to the preferred embodiment of the present invention.
Figure 2:
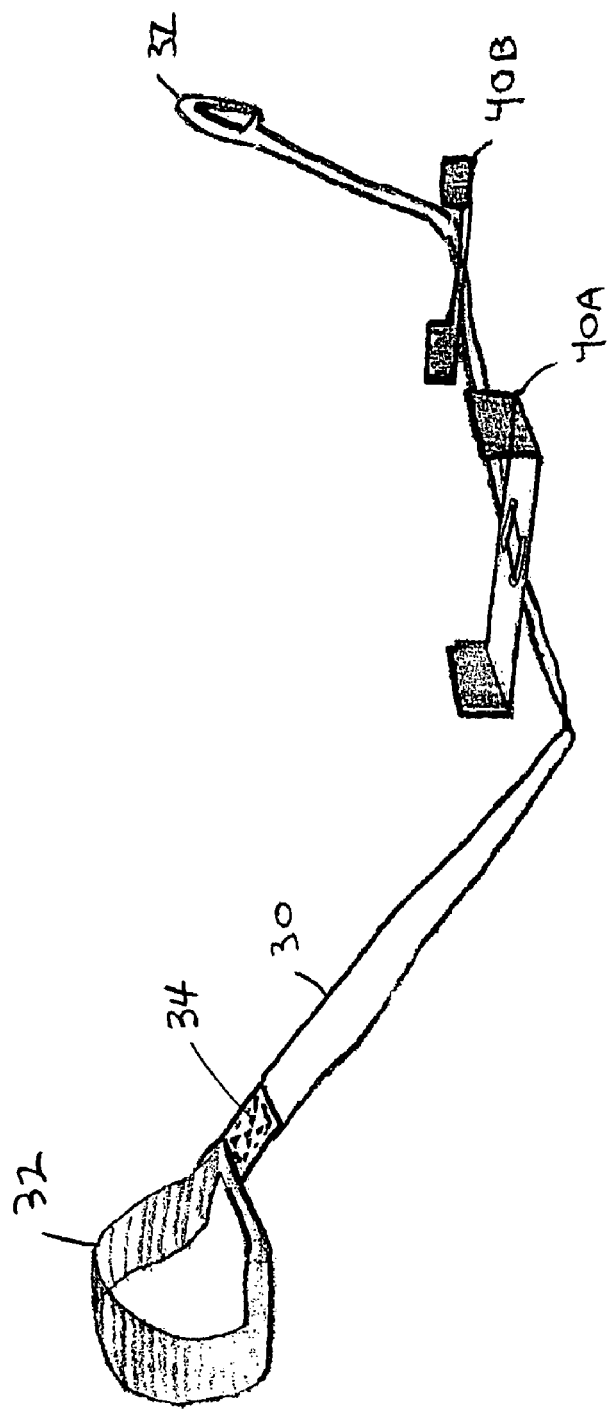
FIG. 2 is an end perspective view of the mattress caddy 20 as in FIG. 1.

FIG. 1 is a perspective view of a mattress caddy 20 being used for transporting a mattress according to the preferred embodiment of the present invention, and FIG. 2 is an end perspective view of the mattress caddy 20.

With collective reference to FIGS. 1 and 2, the preferred embodiment comprises a support strap 30 formed into handles 32 at each end and two identical cradle assemblies 40A and 40B adjustably attached to the strap 30 at spaced intervals between the handles 32. The support strap 30 and cradle assemblies 40A and 40B are preferably fabricated of one of a variety of strong light-weight materials (e.g. nylon, aluminum) to provide the functionality and durability required by the nature of their usage. The handles 32 are preferably about 8" in diameter to loop around the wrist, and may be formed simply by looping strap 30 back upon itself and sewing it into a loop. To ensure that sewn handles 32 are sturdy, the overlapping end of the strap 30 should be sewn onto itself as shown in FIG. 2 in a crisscross pattern 34. Alternatively, hard circular handles may be attached at the ends of strap 30. Either way, the overall length of the support strap 30, inclusive of the loops of the handles 32, is preferably about 116". The present invention's design is simple and straightforward, and can be economically manufactured.

Figure 3:
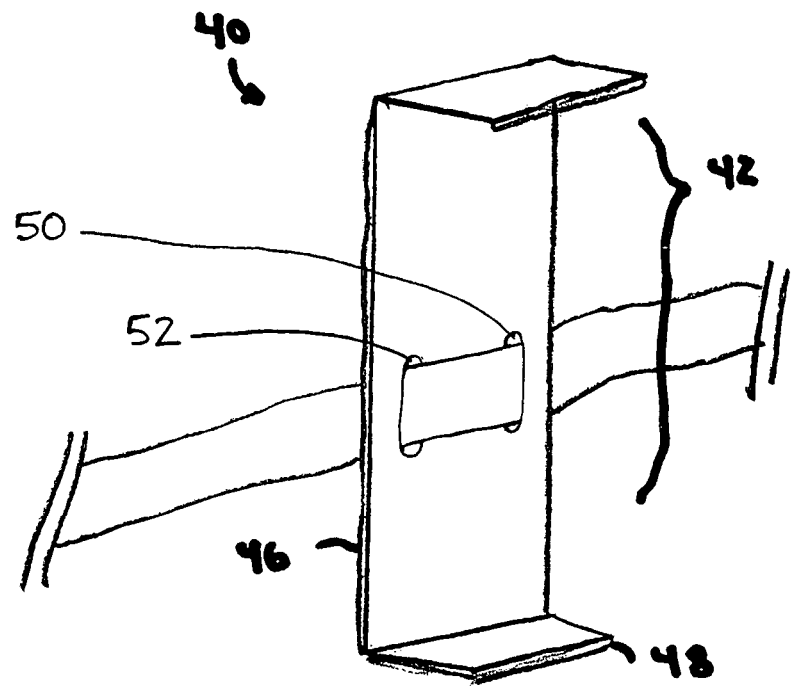
FIG. 3 is a top perspective view of an exemplary cradle assembly 40.
Figure 4:
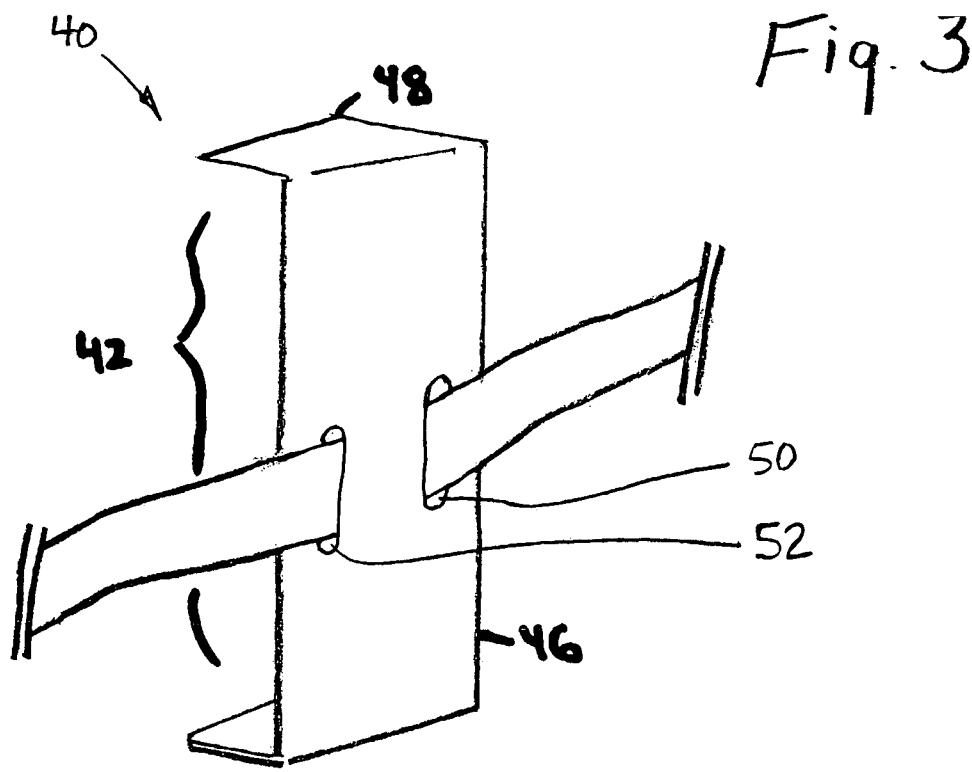
FIG. 4 is a bottom perspective view of the cradle assembly 40 as in FIG. 3.

FIGS. 3 and 4 are, respectively, a top perspective view of one of the two cradle assemblies 40 as shown in FIG. 2, and a bottom perspective view of the cradle assembly 40.

Each cradle assembly 40 comprises a flat support member with upwardly angled edges, thereby defining a channel 42 having a horizontal bottom surface 46 and two vertical sides 48.

The cradle assemblies 40 may be formed from metal such as aluminum, or integrally-molded of plastic or like material (such as by extrusion molding).

Each cradle assembly 40 also comprises two strap retaining slots 50, 52 formed in the bottom surface 46. The sliding engagement between each cradle assembly 40 and the strap 30 is preferably created by passing the strap 30 underneath one section of the bottom surface 46, up through one slot 50, across the top face of the surface 46, and down through the other slot 52 to pass underneath another section of the bottom surface 46.

Referring back to FIG. 1, the mattress caddy 20 is shown being utilized by two users to transport a conventional mattress. In normal usage of the mattress caddy 20, the cradle assemblies 40A and 40B are adjusted along the strap 30 (while the mattress caddy 20 is laying on the ground) to properly space them (to accommodate mattresses of differing lengths). The mattress caddy 20 is laid out lengthwise and the support strap 30 is stretched to its full length and laid flat on the ground or floor. The cradle assemblies 40A, 40B are then positioned, with the vertical sides 48 pointing upward, along the strap 30 at an interval that measures somewhat less (e.g. 4" to 6") than the length of the mattress to be transported. The position of the cradle assemblies 40A, 40B along the support strap 30 may be adjusted lengthwise along strap 30 simply by sliding them there along. The strap 30 freely slides through the slots 50, 52. The interval should be equally distributed around the mid-point of the strap 30 such that each cradle assembly 40A, 40B is an equivalent distance from one of the handles 32. Once the new position of the cradle assembly 40A, 40B along the strap 30 is established, the mattress to be moved is placed atop, thereby fixing the relative positions of the cradle assemblies 40A, 40B. The long edge of the mattress is placed into, and is thereafter supported/cradled by, each of the cradle assemblies 40A, 40B. At this point, each user grasps one of the handles 32 with one hand and places his/her other hand on opposite surfaces respectively, of the vertically-oriented mattress to balance the load, and they lift the mattress off of the ground/floor.

The above-described mattress caddy 20 greatly assists in the two-person manual transportation of large, heavy or unwieldy articles, and specifically mattresses and box springs. Its adjustability equalizes the stature of the two individuals, and the cradle assemblies firmly secure the mattress for improved safety, regardless of the breadth of the mattress. Even when the breadth of the mattress exceeds the extent of the cradle assemblies 40, the vertical sides 48 grip the underside of the mattress and firmly secure it. The users need only grip the handles 32 and raise them to belt level, all using the arms and minimizing stress to the back. Moreover, when carrying the mattress the mattress caddy 20 vastly increases maneuverability, and two individuals can easily round corners and navigate steps. The device is easy to use, relatively simple, and economical to manufacture.

Field testing has demonstrated that a mattress balanced/cradled in the present invention is manually transported up or down stairs, through doorways, etc. with much greater ease and maneuverability than that achieved through attempted use of the manufacturer-supplied, limited handle/support strap carrying system. Additional testing has demonstrated that the manual transportation of a standard king size mattress using the mattress caddy 20 may be accomplished easily by two women of average size/strength, as compared to the typical need for two men of average size/strength required when using the manufacturer-supplied handles/support straps.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. For example, the stated materials used in its construction may be varied as appropriate to suit the design and/or aesthetic constraints and desires of the manufacturer and/or user. It is to be understood, therefore, that the invention may be practiced otherwise than as specifically set forth in the appended claims.

I claim:

1. An apparatus for the transportation of a large, heavy or unwieldy article by two users comprising:

a support strap of longer extent than said article for running end-to-end underneath and thereby cradling said article, said support strap having distal handles at each end for gripping by the respective users; and a plurality of rigid cradle assemblies adjustably attached along said support strap, each cradle assembly comprising a flat support member having upwardly angled edges for cradling said article and providing lateral support therefor, and a plurality of strap retaining slots formed centrally along said flat support member transverse to said edges for threading said support strap there through.

2. The apparatus for the transportation of a large, heavy or unwieldy article by two users according to claim 1 wherein said support strap is fabricated of nylon.

3. The apparatus for the transportation of a large, heavy or unwieldy article by two users according to claim 1, wherein said plurality of cradle assemblies are each integrally-molded of plastic.

4. The apparatus for the transportation of a large, heavy or unwieldy article by two users according to claim 1, wherein the distal handles of said support strap are formed by sewing said strap onto itself at both ends.

5. The apparatus for the transportation of a large, heavy or unwieldy article by two users according to claim 4, wherein said support strap is sewn onto itself at both ends in a cris-cross pattern.

6. A method for the transportation of a large, heavy or unwieldy article by two users comprising the steps of:
   providing an apparatus including a support strap of longer extent than said article for running end-to-end underneath and thereby cradling said article, said support strap having distal handles at each end for gripping by the respective users, and a plurality of cradle assemblies adjustably attached along said support strap, each cradle assembly comprising a flat support member with upwardly angled edges for cradling said article and providing lateral support therefor, and a plurality of strap retaining slots formed centrally along said flat support member transverse to said edges for threading said support strap there through;
   cradling said article in said plurality of cradle assemblies; and
   lifting and transporting said article cradled in said plurality of cradle assemblies via use of said support strap.

* * * * *